United States Patent
Lucia et al.

(10) Patent No.: US 12,164,926 B2
(45) Date of Patent: Dec. 10, 2024

(54) VECTOR DATAFLOW ARCHITECTURE FOR EMBEDDED SYSTEMS

(71) Applicant: CARNEGIE MELLON UNIVERSITY, Pittsburgh, PA (US)

(72) Inventors: Brandon Lucia, Pittsburgh, PA (US); Nathan Beckmann, Pittsburgh, PA (US); Graham Gobieski, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 88 days.

(21) Appl. No.: 17/500,017

(22) Filed: Oct. 13, 2021

(65) Prior Publication Data

US 2022/0113975 A1    Apr. 14, 2022

Related U.S. Application Data

(60) Provisional application No. 63/090,752, filed on Oct. 13, 2020.

(51) Int. Cl.
*G06F 9/38* (2018.01)
*G06F 9/30* (2018.01)

(52) U.S. Cl.
CPC ........ *G06F 9/3838* (2013.01); *G06F 9/30036* (2013.01); *G06F 9/3802* (2013.01)

(58) Field of Classification Search
None
See application file for complete search history.

(56) References Cited

U.S. PATENT DOCUMENTS

| | | | | |
|---|---|---|---|---|
| 5,724,548 A | * | 3/1998 | Takahashi | G06F 12/0877 711/138 |
| 2011/0040955 A1 | * | 2/2011 | Hooker | G06F 9/384 712/225 |
| 2013/0185544 A1 | * | 7/2013 | Hung | G06F 9/3887 712/225 |
| 2017/0083314 A1 | * | 3/2017 | Burger | G06F 9/3859 |
| 2018/0052690 A1 | * | 2/2018 | Tran | G06F 9/384 |
| 2021/0124585 A1 | * | 4/2021 | Grubisic | G06F 9/3867 |
| 2022/0066783 A1 | * | 3/2022 | Chan | G06F 9/5027 |

OTHER PUBLICATIONS

Graham Gobieski, Amolak Nagi, Nathan Serafin, Mehmet Meric Isgenc, Nathan Beckmann, and Brandon Lucia. 2019. MANIC: A Vector-Dataflow Architecture for Ultra-Low-Power Embedded Systems. In Proceedings of the 52nd Annual IEEE/ACM International Symposium on Microarchitecture (MICRO '52). Oct. 12, 2019 (Year: 2019).*

* cited by examiner

*Primary Examiner* — John M Lindlof
(74) *Attorney, Agent, or Firm* — KDW Firm PLLC

(57) ABSTRACT

Disclosed herein is a highly energy-efficient architecture targeting the ultra-low-power sensor domain. The architecture achieves high energy-efficiency while maintaining programmability and generality. The invention introduces vector-dataflow execution, allowing the exploitation of the dataflows in a sequence of vector instructions and to amortize instruction fetch and decode over a whole vector of operations. The vector-dataflow architecture allows the invention to avoid costly vector register file accesses, thereby saving energy.

21 Claims, 4 Drawing Sheets

VECTOR DATAFLOW ARCHITECTURE FOR EMBEDDED SYSTEMS

RELATED APPLICATIONS

This application claims the benefit of U.S. Provisional Patent Application No. 63/090,752 filed Oct. 13, 2020, the contents of which are incorporated herein in their entirety.

GOVERNMENT INTEREST

This invention was made with support of the United States government under contract 1815882, awarded by the National Science Foundation. The U.S. government has certain rights in the invention.

BACKGROUND

Ultra-low-power sensing nodes enable many new applications and are becoming increasingly pervasive and important. Energy efficiency is the key determinant of the value of these devices. Battery-powered nodes require a long-lasting battery and nodes that harvest energy should minimize their time spent recharging. Unfortunately, current devices are energy-inefficient.

The emergence of these tiny, pervasively deployed, ultra-low-power sensing nodes systems enables important new applications in environmental sensing. In- and on-body medical implants, civil infrastructure monitors, and even tiny chip-scale satellites are just a few example of the application of these devices. Existing systems for these applications suffer fundamental inefficiencies that demand new, extremely energy-efficient computer architectures, Sensor devices collect data from a deployed environment and must process raw data to support applications. Processing varies and may entail digital signal processing (DSP), computing statistics, sorting or sophisticated computations such as machine learning (ML) inference using a deep neural network (DNN) or a support vector machine (SVM). As processing sophistication has increased, sensor device capability has also matured to include high-definition image sensors and multi-sensor arrays, increasing sensed data volume.

The challenge with such systems is how to perform sophisticated computations on simple, ultra-low-power systems? One solution offloads work by wirelessly transmitting data to a more powerful nearby computer (e.g., at the "edge" or cloud) for processing. Unfortunately, transmitting data takes much more energy per byte than sensing, storing or computing on that data. While a high-powered device (e.g., a smartphone), with a high-bandwidth, long-range radio, can afford to offload data to the edge or cloud, this is not practical for power-limited, energy-limited and bandwidth-limited sensor devices.

Because offloading is not feasible, the alternative is to process data locally on the sensor node itself. For example, sensor nodes can use commodity off-the-shelf microcontrollers to filter sensed data so that only meaningful data (as defined by the application) are transmitted. Processing data locally at a sensor node eliminates most of the high energy cost of communication but makes the device highly sensitive to energy inefficient computation.

There are two key criteria that make a computation-heavy sensor system effective. First, the system must process data locally at a low operating power and with extremely high energy-efficiency. Second, the system must be programmable and general to support a wide variety of applications. These goals are in tension, because the programmability often carries a significant energy penalty.

Therefore, it would be desirable to provide a highly-programmable architecture that hides microarchitectural complexity while eliminating the energy costs of programmability.

SUMMARY OF THE INVENTION

Disclosed herein is an efficient vector-dataflow architecture for ultra-low-power embedded systems. The invention achieves high energy-efficiency while remaining general-purpose and simple to program. The invention is simple to program because it exposes a standard vector instruction set architecture (ISA) interface based on the RISC-V vector extension.

The high energy-efficiency is achieved by eliminating the two main costs of programmability through its vector-dataflow design. First, vector execution amortizes instruction supply energy over a large number of operations. Second, the high cost of accessing a vector register file is addressed using a dataflow component by forwarding operands directly between vector operations. The invention transparently buffers vector outputs in a small forwarding buffer and, at instruction issue, renames vector operands to directly access the forwarding buffer, eliminating read accesses to the VRF. Additionally, the vector ISA is extended with kill annotations that denote the last use of a vector register, eliminating write accesses to the VRF. The vector-dataflow architecture is efficient because it amortizes the energy of tracking dataflow across many vector operations, thereby eliminating a large fraction of VRF accesses with simple micro-architectural changes that leave the basic vector architecture intact.

Finally, the invention implements a code scheduling algorithm that exploits the operand forwarding to minimize VRF energy, while being micro-architecturally agnostic. In other words, it is not necessary to expose the details of the pipeline architecture or the size of the forwarding buffers to minimize VRF energy.

DETAILED DESCRIPTION

Disclosed herein is an architecture implementing the vector-dataflow execution model. There are two main goals of vector-dataflow execution. The first goal is to provide general-purpose programmability. The second goal is to do this while operating efficiently by minimizing instruction and data supply overheads. Vector-dataflow achieves this through three features: (i) vector execution; (ii) dataflow instruction fusion; and (iii) register kill points.

Vector Execution—The first main feature of the execution model of the invention is vector execution. Vector instructions specify an operation that applies to an entire vector of input operands. The key advantage of vector operation for an ultra-low-power design is that control overheads imposed by each instruction (i.e., instruction cache access, fetch, decode, and issue) amortize over the many operands in the vector of inputs. Vector operation dramatically reduces the cost of instruction supply and control, which is a primary energy cost of general-purpose programmability. Vector operation is thus a key ingredient in the energy-efficiency of the invention.

Figure 1A:
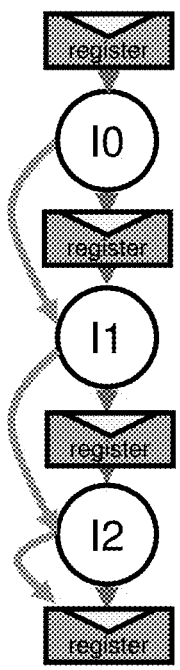
FIGS. 1A-1C are block diagrams showing a comparison between a scalar model and a vector model and the vector-dataflow model disclosed herein.
Figure 1B:
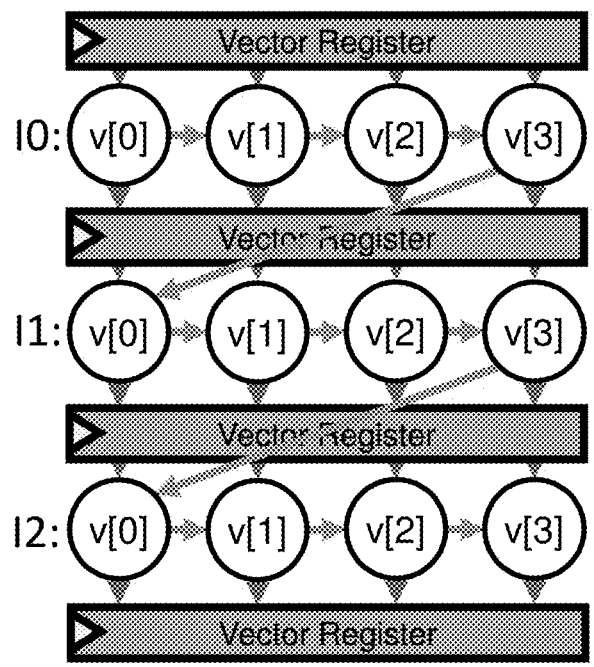
Figure 1C:
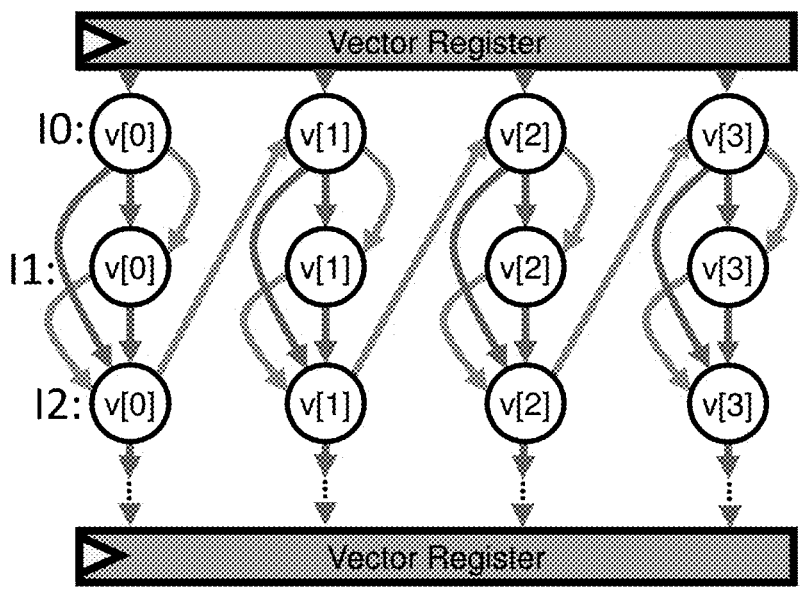

FIGS. 1A-1C illustrate the difference between scalar execution and vector execution. The model shown in FIG. 1A executes a sequence of instructions in a scalar fashion. Dark arrows show dataflow and light arrows show control flow. Instructions proceed in sequence and write to and read from the register file to produce and consume outputs and operands. The model shown in FIG. 1B executes the same sequence of instructions in a vector execution. The execution performs the vector instruction's operation on each element of the vector in sequence, consuming operands from and producing outputs to the register file for each operation over the entire vector. Control proceeds horizontally across each of the vector's elements for a single vector instruction before control transfers vertically to the next vector instruction. Vector execution amortizes the control overhead of a scalar execution because a single instruction corresponds to an entire vector-worth of operations.

Dataflow Instruction Fusion—The second main feature of the execution model of the invention is dataflow instruction fusion. Dataflow instruction fusion identifies windows of contiguous, dependent vector instructions. Dataflow instruction fusion eliminates register file reads by directly forwarding values between instructions within the window. A comparison with a typical vector machine illustrates the benefit of dataflow instruction fusion. In a typical vector machine, instructions execute independently of each other and each operation performs two vector register file reads and one vector register file write. Accessing the vector register file has an extremely high energy cost that scales poorly with the number of access ports. With dataflow instruction fusion, each instruction that receives a forwarded input avoids accessing the expensive vector register file to fetch its input operands. Avoiding these reads reduces the total energy cost of executing a window of vector instructions.

FIG. 1C illustrates the difference between vector execution and the vector-dataflow execution of the present invention. Vector-dataflow first identifies data dependencies among a sequence of vector instructions in a fixed-size instruction window. After identifying dependences between instructions in the window, an efficient dataflow forwarding path is created between dependent instructions (using the forwarding mechanism described below). FIG. 1C shows a window of dependent operations made up of instructions I0, I1, and I2. Execution begins with the first vector instruction in the window (I0) and the first element of the vector (v [0]). However, unlike a typical vector execution, control transfers vertically first, next applying the second vector instruction to the first vector element. The light arcs illustrate vertical execution of I0, followed by I1, then I2 to the vector inputs represented by v [0]. After vertically executing an operation for each instruction in the window for v [0], the light arcs show that control steps horizontally, executing the same window of operations on the next element of the vector, v [1]. The dark arrows illustrate the dataflow forwarding captured by vertical execution in a window of vector-dataflow execution. The dark arrow from I0 to I2 shows that the value produced by I0 is forwarded directly to I2 without storing the intermediate result in the vector register file.

Vector Register Kill Points—The third main feature of the execution model of the invention is its use of vector register kill points. A vector register is dead at a particular instruction if no subsequent instruction uses the value in that register. Hence, a dead value need not be written to the vector register file. The instruction at which a vector register becomes dead is the kill point for that register. Although values between dependent instructions are forwarded without going through the vector register file, each operand must normally be written back to the vector register file because the operand may be used later in a later window. However, if a program explicitly informs of each register's kill points, then register file writes associated with those registers can be eliminated. In this invention, each operand of an instruction is tagged with an optional kill bit that indicates that the register is dead at that instruction, and its value need not be written back to the vector register file. Kill bits do not affect programmability because they are optional; a compiler analysis to identify dead registers is simple and kill bits do not expose micro-architectural details, such as the size of the instruction window.

Applications Benefit From Vector-Dataflow—Abundant opportunities for vector-dataflow execution exist. Regardless of the window size, an application has more exploitable vector dataflows if its sequences of dependent instructions tend to be shorter. The length of a dependent instruction sequence is characterized by the distance (or number of instructions) between a when register's value is produced and when that register is killed (i.e., at the kill point, referred to herein as the "kill distance"). Shorter kill distances require fewer resources for forwarding in a window and make a window of any size more effective.

Synchronization and Memory Consistency—The vector unit runs as a loosely-coupled co-processor with the scalar core. As a result, vector and scalar execution must be synchronized to ensure a consistent memory state. A typical sequentially consistent model would require frequent stalls in the scalar core to disambiguate memory and, worse, would limit the opportunity for forwarding in the vector unit These issues could be avoided with micro-architectural speculation, including load-store disambiguation and misspeculation recovery mechanisms, but such mechanisms are too expensive for ultra-low-power applications. Moreover, in practice, the scalar core and the vector unit rarely touch the same memory during compute-intensive program phases, so the mechanisms would be largely unused.

In this invention, a new "vfence" instruction is added that handles both synchronization and memory consistency. vfence stalls the scalar core until the vector unit completes execution with its current window of vector-dataflow operations. The use of vfence operations is very similar to memory fences for concurrency in x86, ARM, and other widely commercially available processors. Properly used, vfence operations cause the execution of the scalar and vector cores to be sequentially consistent. In practice, this often means inserting a vfence at the end of the kernel.

As with any system relying on fences, the programmer is responsible for their correct use (i.e., avoiding data races). Relying on the programmer to avoid data races is practical because compilers struggle with alias analysis, reasonable because vfences are rare, and consistent with common practice in architectures and high-level programming languages.

Ultra-Low Power Vector Dataflow Processing—The invention comprises a processor micro-architecture that implements the vector-dataflow execution model to improve energy efficiency while maintaining programmability and generality. The hardware/software interface of the invention based on the RISC-V ISA vector extension.

The invention adds a vector unit with a single lane to a simple, in-order scalar processor core. The vector unit has a few simple additions to support vector-dataflow execution: instruction windowing hardware and a renaming mechanism together implement forwarding between dependent instructions. With no modifications to the ISA, the invention runs programs efficiently. With a minor ISA change, the invention further improves efficiency by conveying register kill annotations. The micro-architecture uses these annotations to kill registers instead of incurring the cost of writing them to the vector register file, The software interface to the vector execution engine is the RISC-V ISA vector extension and RISC-V code will run efficiently on with only minor modifications to add vfence instructions for synchronization and memory consistency.

A programmer may further optionally recompile their code using a custom compiler to use minor ISA changes that support code scheduling and vector register kill annotations. These compiler-based features do not require programming changes, do not expose micro-architectural details, and are optional to the effective use of the invention.

The invention implements the RISC-V V vector extension. RISC-V V does not specify a fixed number of vector registers, but its register name encoding includes five bits for vector register names. 16 vector registers are implemented, requiring four bits to name, and leaving a single bit in the register name unused, which is used to convey kill annotations from the compiler to the micro-architecture. If either of an instruction's input registers has its high-order bit set, the encoded instruction indicates that the register dies at that instruction. To support code scheduling, an optional compiler support runs the dataflow code scheduling algorithm (described below). After scheduling, the compiler analyzes definitions and uses of each register and adds a kill annotation to a killed register's name in the instruction at which it dies.

Figure 2:
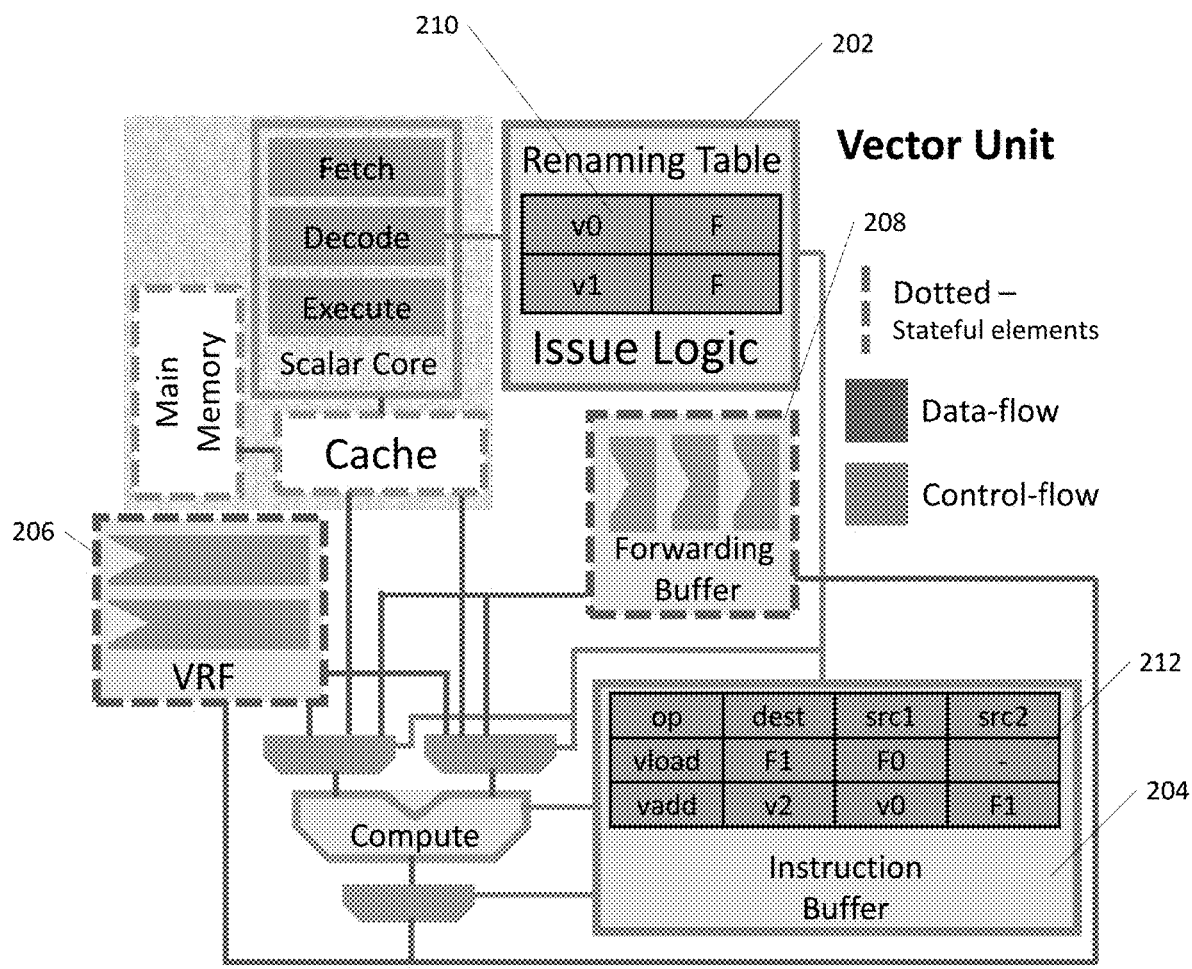
FIG. 2 is a block diagram of the micro-architectural components of the vector-dataflow model disclosed herein.

Micro-Architecture—The foundation of the invention's micro-architecture is an in-order, single-issue vector core with a single execution lane that is equipped with a single functional unit. The invention adds four components to this base vector core to support vector-dataflow execution: (1) an issue logic and a register renaming table; (2) an instruction window buffer; (3) an xdata buffer; and (4) a forwarding buffer. FIG. 2 shows an overview of the design and how these components relate to one another.

Issue Logic and Register Renaming—The issue logic 202 of the invention is primarily responsible for creating a window of instructions to execute according to vector-dataflow. Issue logic 202 activates once per window of instructions, identifying, preparing, and issuing for execution a window of dependent instructions over an entire vector of inputs. A key parameter of issue logic 202 is the length of the instruction buffer window 204. Issue logic 202 analyzes a short sequence of instructions that has the same number of instructions as instruction buffer 204 can hold. Issue logic 202 identifies dataflow between instructions by comparing the names of their input and output operands. If two instructions are dependent (i.e., the output of one of the instructions is the input of another), the output value is forwarded directly from the output of the producer instruction to the input of the consumer instruction, thereby avoiding writing to and reading from the vector register file 206. Issue logic 202 implements forwarding by renaming the register operands of the instructions to refer to a free location in forwarding buffer 208, instead of to vector register file 206. Issue logic 202 records the renaming in the renaming table 210, which is a fixed-size, directly-indexed table, with one entry for each operand that can be renamed in a window of instructions. After issue logic 202 identifies dependent operations and performs renaming for a window of operations, it dispatches the window of operations for execution.

Instruction Buffer—The invention uses instruction buffer 204 to store an issued window 212 of instructions that have had their register operands renamed by issue logic 202. Instruction buffer 204 and its associated control logic (not shown) determine what operation the single functional unit should execute next. The control logic of instruction buffer 204 executes the operation represented by each instruction stored in instruction buffer 204. As shown in FIG. 1C, execution proceeds first vertically, through the entire window 212, and then horizontally through the vector. A key feature of the control logic of instruction buffer 204 is its ability to select an operand's source or destination. For input operands, instruction window 212 controls whether to fetch an operand from vector register file 206 or from forwarding buffer 208 (in the case of an operand being forwarded between instructions in the window). Likewise, for output operands, instruction window 212 controls whether to write an output operand to vector register file 206, to forwarding buffer 208, or to both.

There are several classes of instructions that limit the size of instruction window 212. These include stores, permutations, and reductions. Permutations and reductions require interactions between elements in a vector, which creates a horizontal dependence between operations on different vector elements. Forwarding for such operations is not supported because of the complexity of the dependence tracking that they introduce. Instead, these operations execute one element at a time, ultimately writing to the vector register file.

A store also ends issuing for a window. A store may write to a memory location that a later operation loads from. Such a through-memory dependence is unknown until execution time. Consequently, it is conservatively assumed that the address of any store may alias with the address of any load or store in window 212 (i.e., in a later vector element). A store ends the construction of a window to avoid the need for dynamic memory disambiguation to detect and avoid the effect of such aliasing. Given the added programming complexity for minimum benefit, such an instruction is unnecessary.

Xdata Buffer—Some instructions, like vector loads and stores, require extra information (e.g., base address and stride) available from a scalar register file when the instruction is decoded. Due to the loosely coupled nature of the invention, this extra information must be buffered alongside the vector instruction. Because not all vector instructions require values from the scalar register file, the invention includes a separate buffer, called the "xdata buffer", shown as reference number 302 in FIG. 3, to hold this extra information. Entries in instruction buffer 204 contain indices into xdata buffer 302 as needed. During execution, the invention uses these indices to read information from xdata buffer 302 and execute accordingly.

Forwarding Buffer—Forwarding buffer 208 is a small directly-indexed buffer that stores intermediate values as the execution unit forwards them to dependent instructions in instruction window 212. Issue logic 202 lazily allocates space in forwarding buffer 208 and renames instruction's forwarded operands to refer to these allocated entries. The benefit of forwarding buffer 208 is that it is very small, which corresponds to a very low static power and access energy compared to the relatively high static power and access energy of vector register file 206. By accessing forwarding buffer 208 instead of accessing vector register file, 206 an instruction with one or more forwarded operands consumes less energy than one that requires accessing vector register file 206.

Efficient Reductions—RISC-V V contains reduction instructions like "vredsum v1 v2", which adds up all elements of v2 and writes the sum into the first element of v1. The invention relies on forwarding buffer 208 to avoid accesses of vector reference file 206 for reductions. Instead of writing partial results to vector reference file 206, the invention allocates space in forwarding buffer 208 for partial accumulation. The decode logic recognizes a reduction, allocates space, and remaps the second source operand and the destination to point to the entry in forwarding buffer 208. During execution, the partial result is used in forwarding buffer 208 as one source for the reduction (e.g., sum) and it is overwritten with the new value as it is produced. This optimization re-purposes existing dataflow mechanisms to save an entire vector-length of vector reference file reads and writes for reductions.

Structural Hazards—There are three structural hazards that cause the invention to stop buffering additional instructions, stall the scalar core, and start vector execution. The first hazard occurs when instruction buffer 204 is full and another vector instruction is waiting to be buffered. The second hazard occurs when all slots in forwarding buffer 208 are allocated and an incoming instruction requires a slot. Finally, the third hazard occurs when xdata buffer 302 is full and a decoded vector instruction requires a slot. The prevalence of each hazard depends on the size of the buffers associated with each. The first hazard is most common, while the other two tend to be rare.

EXAMPLE IMPLEMENTATION

Figure 3:
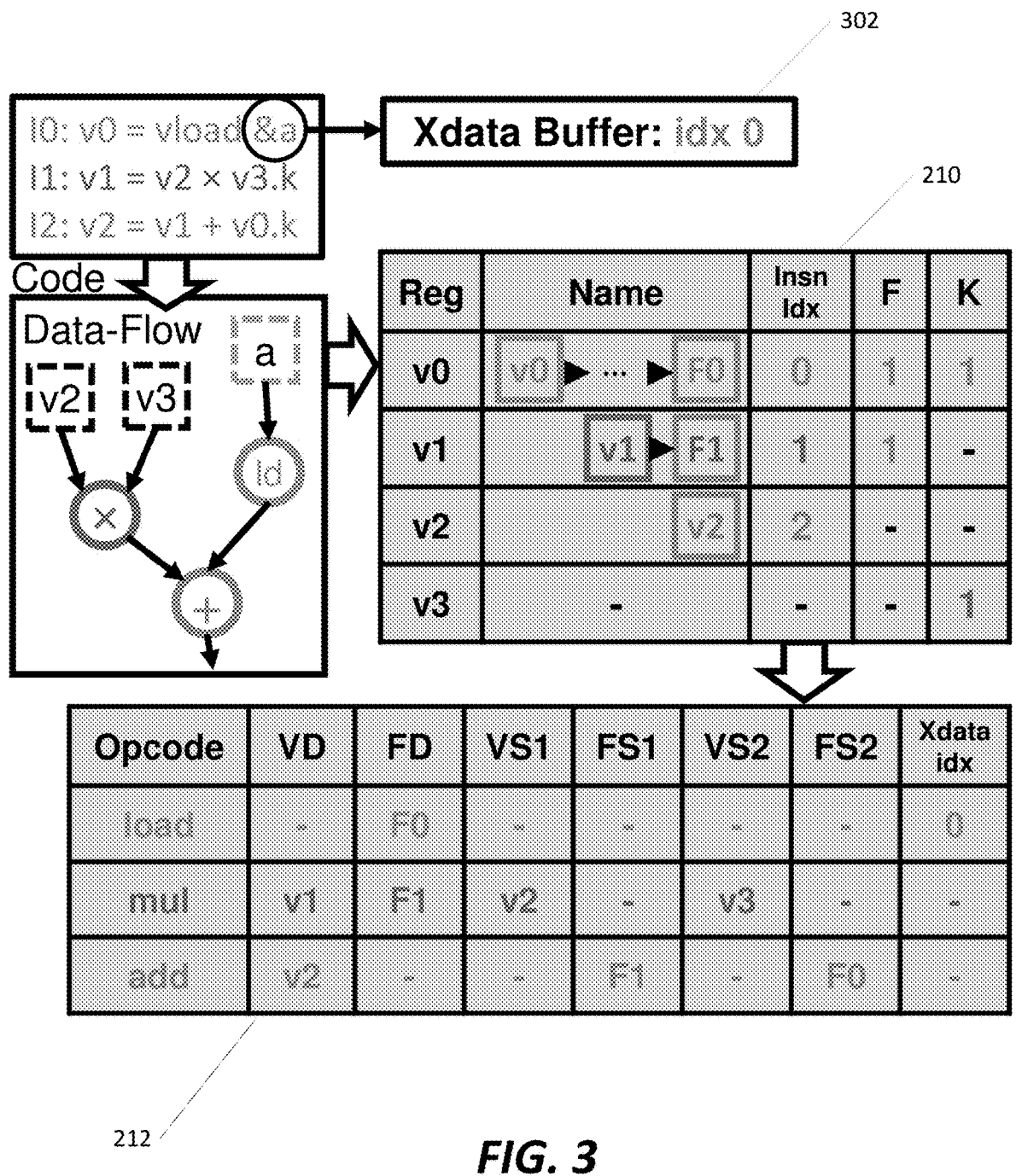
FIG. 3 is a block diagram showing the means by which issue logic constructs windows of instructions with dataflow.

The operation of issue logic 202, renaming table 210, instruction window 212, and forwarding buffer 208 are illustrated with an example of the operation of the invention, shown in FIG. 3. The figure starts with vector-aware assembly code that is transformed into vector-dataflow operations by populating renaming table 210 and instruction buffer 204 with information about the dataflow. Vector assembly instructions pass into micro-architectural mechanisms as they decode to issue logic 202 and later execute.

Issuing Instructions and Renaming Operands—FIG. 3 shows a three-instruction program and illustrates how issue logic 202 populates the instruction buffer 204 and remaps registers for each instruction.

vload: Issue logic 202 records the load in the instruction window 212 and, because the instruction is a vector load and requires a base address, also inserts the base address ("&a" forwarded from the scalar register file) into xdata buffer 302. In addition, issue logic 202 writes an empty renaming entry to v0 in renaming table 210 along with the index of the instruction in the instruction buffer. An empty renaming entry at execution time signifies a vector register write. However, during issue, an empty entry may be filled by an instruction added to the instruction window later during the same issue phase.

vmul: The multiply instruction consumes two register operands that are not in renaming table 210 and, at execution time, will issue two vector register file reads. As with the load, issue logic 202 records the output register of the multiply with an empty entry in renaming table 210 as well as the index of the multiply in instruction buffer 212.

vadd: The inputs of the add are v0 and v1 with the kill annotation indicating that the instruction kills register v0. Issue logic 202 looks up each input operand in renaming table 210 and, finding both have valid entries, identifies this instruction as the target for forwarding. Issue logic 202 remaps v0 to refer to the first entry of the forwarding buffer and v1 to the second position. The load instruction in instruction buffer 212 (found by the saved index in renaming table 210) is updated and will store its result in F0 instead of v0. Similarly, the multiply instruction is also updated and will store its result in F1, but, because v1 is not killed, it will still be written-back to vector register file 206. The add instruction then will fetch its input operands from F0 and F1 instead of from vector register file 206. The kill annotations associated with v3 and v0 follow the re-written instructions into instruction window 212, enabling their use during execution to avoid writes to vector register file 206.

Figure 4:
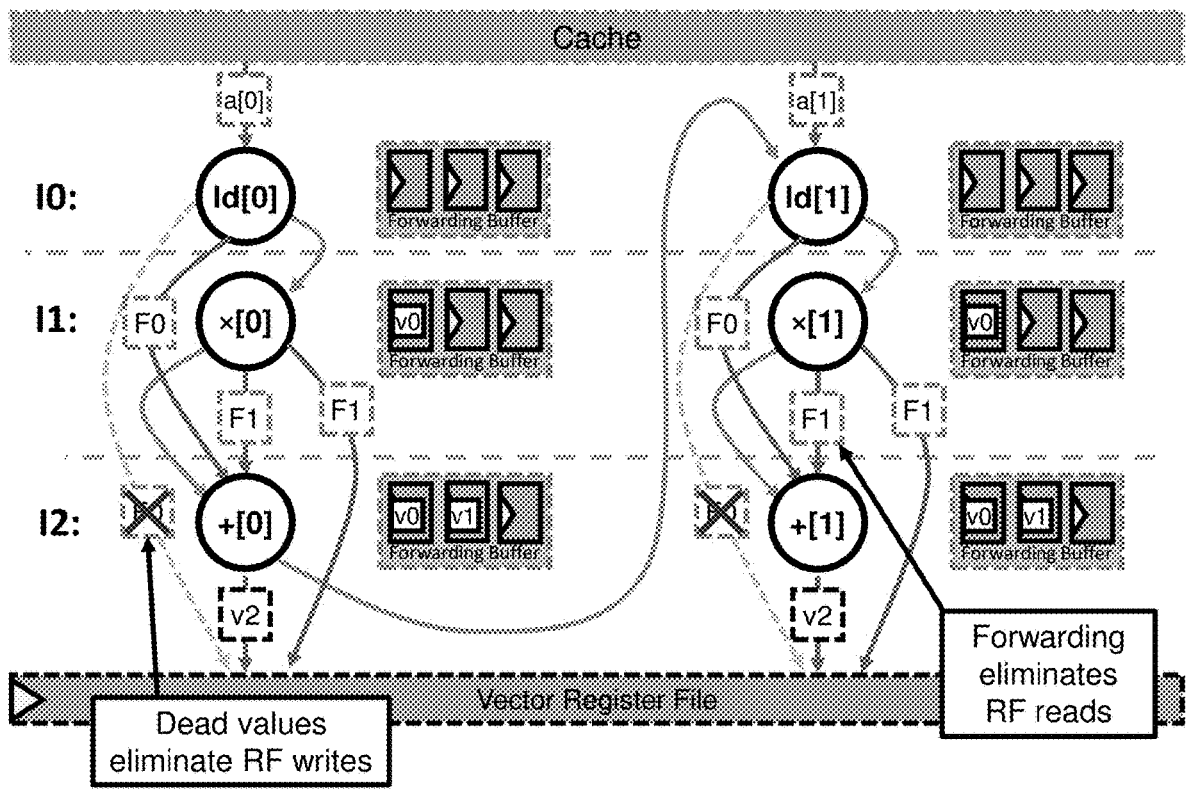
FIG. 4 is a block diagram showing how the micro-architecture components of the present invention execute a window of instructions using forwarding according to dataflow across an entire vector of input.

Executing a Window of Instructions—After issue, the window of instructions 212 is ready to execute. FIG. 4 shows (via the light control-flow arcs) how the window 212 executes vertically for a single vector element before moving on to execute the entire window for the second vector element. The dark dataflow arcs show how values between dependent instructions are forwarded using the forwarding buffer. The green squares (e.g., "F0" and "F1") indicate forwarded values. FIG. 4 also shows how the invention uses a kill annotation at runtime. The registers with kill annotations (v0 and v3) need not be written to the vector register file when the window completes executing, sparing the execution two vector register writes required by a typical vector execution.

Micro-Architecture-Agnostic Dataflow Scheduling—The final feature of the invention is micro-architecture-agnostic dataflow scheduling. This feature is an optional compiler feature that re-orders vector instructions to make dependent operations as close as possible to one another. If dependent operations are closer together in an instruction sequence, then it is more likely that they will appear together in one of the vector-dataflow windows 212. By re-ordering operations to appear close together in a window, the invention creates more opportunities to forward values from a producer instruction to a consumer instruction, eliminating more vector register file accesses.

The dataflow scheduler does not compromise programmability or generality. Additionally, the programmer need not understand the micro-architecture to realize the benefits of the dataflow scheduler. The dataflow scheduler minimizes the forwarding distance between dependent instructions, rather than targeting a particular window size. While not always optimal for a given window size, this micro-architecture-agnostic optimization prevents the compiler from being brittle or dependent on the micro-architectural parameters of a particular system.

To minimize forwarding distance between dependent instructions, the dataflow code scheduler uses sum kill distance. A vector register's kill distance is the number of instructions between when an instruction defines the register and when the value in the register is used for the last time (i.e., when the register dies). The sum kill distance is the sum of all register's kill distances across the entire program. To remain agnostic to the window size of a particular implementation, the code scheduler minimizes the sum kill distance (which is equivalent to minimizing average kill distance). The sum kill distance is a proxy for the number of register writes in a program because, if a register does not die during a window's execution, the system must write its value back to vector register file 206. When sequences of dependent instructions are closer together, their intermediate values die more quickly, because registers need not remain live waiting for unrelated instructions to execute. A larger window accommodates dependence chains that include longer kill distances.

Dataflow code scheduling is implemented using brute force (i.e., exhaustive) search for small kernels containing fewer than 12 vector operations. For larger kernels (e.g., Fast Fourier Transform computations), dataflow code scheduling is implemented via simulated annealing that randomly mutates instruction schedules, while preserving dependences, to produce a new valid schedule, accepting this new schedule with some probability. The micro-architecture-agnostic minimization of the sum kill distance closely approximates a micro-architecture-specific approach that optimizes for a particular window size.

The invention disclosed herein comprises an ultra-low-power embedded processor architecture that achieves high energy efficiency without sacrificing programmability or generality. The key to the efficient operation is the vector-dataflow execution model in which dependent instructions in a short window forward operands to one another according to dataflow. Vector operation amortizes control overhead. Dataflow execution avoids costly reads from the vector register file. Compiler and software support helps avoid further vector register file writes in a micro-architecture-agnostic way. The microarchitecture implementation directly implements vector-dataflow with simple hardware additions, while still exposing a standard RISC-V ISA interface.

As would be realized by one of skill in the art, many variations in the architecture and in the arrangement and order of components are possible and are contemplated to be within the scope of the invention, which is defined in the claims which follow.

The invention claimed is:

1. A processor architecture implementing a vector-dataflow execution model comprising:
    a scalar processor core;
    a vector processor core comprising:
        issue logic;
        an instruction buffer for execution of a window of vector instructions;
        instruction buffer control logic;
        a forwarding buffer; and
        a register renaming table;
    wherein the issue logic performs the functions of:
        identifying a window of contiguous vector instructions;
        identifying one or more pairs of dependent vector instructions within the window of contiguous vector instructions wherein the dependent instructions have a common operand as the output of a producer instruction and an input of a consumer instruction;
        modifying the producer instructions to cause the producer instructions to store their results in free locations in the forwarding buffer instead of to a vector register file;
        modifying the consumer instructions to cause the consumer instructions to fetch their input operands from locations in the forwarding buffer where the producer instructions have stored the outputs instead of from the vector register file;
        recording, in the register renaming table, the location of each common operand in the forwarding buffer; and
        storing the window of contiguous vector instructions to the instruction buffer for execution;
    wherein the instruction buffer control logic determines, at execution time, for each instruction in the instruction buffer, whether to fetch an operand for that instruction from the forwarding buffer or from the vector register file and whether to store the result of the instruction in the forwarding buffer or to the vector register file, based on whether or not there is an entry for that operand in the register renaming table;
    wherein the forwarding buffer is smaller than the vector register file; and
    wherein the contiguous vector instructions are executed one element at a time.

2. The architecture of claim 1 wherein the instruction buffer control logic determines an order of execution for the instructions in the instruction buffer and executes an operation represented by each instruction in the instruction buffer.

3. The architecture of claim 2 wherein execution of the instructions proceeds across each element of a vector for a single vector instruction before executing the next vector instruction in the instruction buffer.

4. The architecture of claim 2 wherein the instruction buffer control logic fetches or stores renamed operands from the forwarding buffer, further comprising:
    accessing the renaming table to determine operands that have been renamed.

5. The architecture of claim 1 wherein the renaming table is a fixed size, directly-indexable table having one entry for each renamed operand.

6. The architecture of claim 2 further comprising:
    an xdata buffer containing information from a scalar register file necessary for performing vector loads and stores;
    wherein the instruction buffer control logic contains indices into the xdata buffer as needed when information from the scalar register file is needed to fetch or store operands.

7. The architecture of claim 1 wherein the forwarding buffer is a directly-indexed buffer storing intermediate values of operands for forwarding to dependent instructions.

8. The architecture of claim 1 wherein identifying instructions within the window of continuous vector instructions that have a dataflow dependency therebetween comprises:
    comparing names of input and output operands for each vector instruction to determine if output operands of any instruction match input operands of any other vector instruction.

9. The architecture of claim 1 wherein the architecture is used in low-power embedded systems.

10. The architecture of claim 1 wherein the architecture uses a custom compiler having a modified ISA to supporting code scheduling and vector register kill annotations.

11. The architecture of claim 10 wherein the kill annotations denote the last use of a vector register.

12. The architecture of claim 11 wherein the kill annotation comprises a kill bit for each register indicating that the register is dead at that instruction.

13. A method implementing a vector-dataflow execution model comprising:
    identifying one or more pairs of vector instructions within a window of contiguous vector instructions that have a dataflow dependency therebetween wherein the dependent instructions have a common operand as the output of a producer instruction and an input of a consumer instruction;

modifying the producer instructions to cause the producer instructions to store their results in a free location in a forwarding buffer instead of to a vector register file;

modifying the consumer instructions to cause the consumer instructions to fetch their input operands from locations in the forwarding buffer where the producer instructions have stored the outputs instead of from the vector register file;

recording, in a register renaming table, the location of each common operand in the forwarding buffer; and storing the window of contiguous vector instructions with renamed operands to an instruction buffer for execution;

wherein instruction buffer control logic determines, at execution time, for each instruction in the instruction buffer, whether to fetch an operand for that instruction from the forwarding buffer or from the vector register file and whether to store the result of the instruction in the forwarding buffer or to the vector register file, based on whether or not there is an entry for that operand in the register renaming table;

wherein the forwarding buffer is smaller than the vector register file; and wherein the contiguous vector instructions are executed one element at a time.

14. The method of claim 13 further comprising:
determining an order of execution for instructions in the instruction buffer; and
executing an operation represented by each instruction in the instruction buffer.

15. The method of claim 14 further comprising:
selecting a source or destination for each operand of each instruction prior to execution of the instruction.

16. The method of claim 15 further comprising:
accessing the renaming table to determine operands that have been renamed.

17. The method of claim 16 wherein selecting a source or destination for each operand of each instruction prior to execution of the instruction comprises:
determining that an entry for a particular operand for an instruction appears in the renaming table; and
fetching the particular operand from the forwarding buffer.

18. The method of claim 16 wherein selecting a source or destination for each operand of each instruction prior to execution of the instruction comprises:
determining that an entry for a particular operand for an instruction does not appear in the renaming table; and
fetching the particular operand from a vector register file.

19. The method of claim 18 further comprising:
retrieving information from an xdata buffer when instructions in the instruction buffer require information from a scalar register file to fetch or store operands.

20. The method of claim 13 further comprising:
identifying kill annotations in the window of contiguous vector instructions indicating last use of a vector register; and
eliminating further access of the vector register after the kill annotation.

21. The method of claim 13 further comprising:
stalling execution of the scalar processor core until completion of the execution of the current instruction buffer by the vector processor core.

* * * * *